US008941868B2

(12) United States Patent
Arpino et al.

(10) Patent No.: US 8,941,868 B2
(45) Date of Patent: Jan. 27, 2015

(54) SYSTEM AND METHOD FOR PROCESSING MULTIPLE MAILING SERVICES ORDERS OF VARYING QUANTITIES AND ADDRESS LISTS

(75) Inventors: Daniel Arpino, Wellesley, MA (US);
Robert Sheehan, Arlington, MA (US);
Marc Tanner, Somerville, MA (US);
Brendan Shea, Medford, MA (US);
Jacob Hyman, Somerville, MA (US);
Adrian Griego, Abington, MA (US);
Philipp Nietlispach, Boston, MA (US);
John Marcos, Belmont, MA (US);
Brian Olson, Medford, MA (US)

(73) Assignee: Vistaprint Schweiz GmbH, Winterthur (CH)

( * ) Notice: Subject to any disclaimer, the term of this patent is extended or adjusted under 35 U.S.C. 154(b) by 107 days.

(21) Appl. No.: 13/588,624

(22) Filed: Aug. 17, 2012

(65) Prior Publication Data
US 2014/0049795 A1 Feb. 20, 2014

(51) Int. Cl.
G06K 15/02 (2006.01)
(52) U.S. Cl.
USPC ........................................ 358/1.15; 358/1.17
(58) Field of Classification Search
CPC ....... H04L 12/14; G06F 21/10; G06F 3/1259; H04N 21/2543; H04N 1/32545
USPC ..................... 358/1.14, 1.15, 1.12, 1.18, 1.17
See application file for complete search history.

(56) References Cited

U.S. PATENT DOCUMENTS

| 4,847,764 | A * | 7/1989 | Halvorson | 700/231 |
| 6,481,703 | B2 * | 11/2002 | Yoshida et al. | 270/58.08 |
| 6,758,802 | B2 * | 7/2004 | Fitzgerald et al. | 493/476 |
| 2005/0103687 | A1 * | 5/2005 | DeWitt et al. | 209/3 |
| 2006/0001898 | A1 * | 1/2006 | Maeshima et al. | 358/1.14 |
| 2006/0159499 | A1 * | 7/2006 | Watanabe et al. | 399/391 |
| 2008/0306884 | A1 | 12/2008 | Weinberg et al. | |
| 2010/0038839 | A1 * | 2/2010 | DeWitt et al. | 270/52.01 |
| 2011/0178633 | A1 | 7/2011 | Marrese et al. | |
| 2013/0335464 | A1 * | 12/2013 | Gerber | 347/4 |
| 2013/0335467 | A1 * | 12/2013 | Gerber | 347/8 |

FOREIGN PATENT DOCUMENTS

WO 97/21176 6/1997

OTHER PUBLICATIONS

"Notification of Transmittal of the International Search Report and the Written Opinion of the International Searching Authority, or the Declaration," mailed on Feb. 10, 2014 for International Application No. PCT/US13/51185.

* cited by examiner

Primary Examiner — Jerome Grant, II
(74) Attorney, Agent, or Firm — Jessica Costa

(57) ABSTRACT

Methods and systems for processing multiple mailing services orders for print items of varying quantities include filling 3-dimensional gangs configured to receive print-ready items with print-ready items in a stack-wise manner. Individual stacks can be submitted to the system for reprint without holding up remaining items in an order.

12 Claims, 8 Drawing Sheets

200

210a  Name$_a$         Street Address$_a$    City$_a$    State$_a$    Zip$_a$
210b  Name$_b$         Street Address$_b$    City$_b$    State$_b$    Zip$_b$

.
.
.

210n  Name$_n$         Street Address$_n$    City$_n$    State$_n$    Zip$_n$

| 401 | 402 | 403 |
|---|---|---|
| Order ID | Quantity | Active Quantity |
| Order ID$_x$ | Quantity$_x$ | Active Quantity$_x$ |
| Order ID$_y$ | Quantity$_y$ | Active Quantity$_y$ |
| . | | |
| . | | |
| . | | |
| Order ID$_z$ | Quantity$_z$ | Active Quantity$_z$ |

| 401 | 502 | 503 |
|---|---|---|
| Order ID | Address | Fulfillment Item ID |
| Order ID$_x$ | Address$_1$ | Fulfillment Item ID$_a$ |
| Order ID$_x$ | Address$_2$ | Fulfillment Item ID$_a$ |
| Order ID$_x$ | Address$_m$ | Fulfillment Item ID$_b$ |
| Order ID$_y$ | Address$_{y1}$ | Fulfillment Item ID$_c$ |
| Order ID$_y$ | Address$_{y2}$ | Fulfillment Item ID$_c$ |
| Order ID$_z$ | Address$_{zn}$ | Fulfillment Item ID$_g$ |

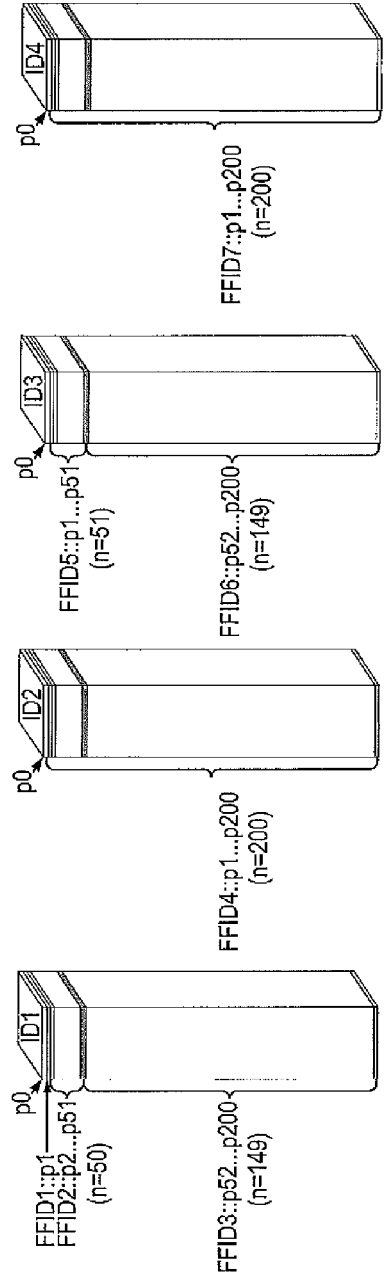
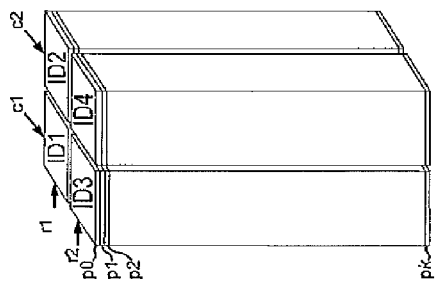

SYSTEM AND METHOD FOR PROCESSING MULTIPLE MAILING SERVICES ORDERS OF VARYING QUANTITIES AND ADDRESS LISTS

BACKGROUND OF THE INVENTION

The present invention relates generally to print and mailing services, and more particularly to methods and systems for processing multiple mailing services orders for printing and mailing varying quantities of different printed products with and to a variable list of addresses.

Many businesses have a need to mail out printed postcards or envelopes or other printed matter to a large list of different addresses. For example, advertising through the mail has been around for many decades. Some printing businesses offer a mailing service which allows a business or individual to provide a design to be printed on a postcard, brochure, or other addressable mail item, and then have the mailing services provider print a desired quantity of the addressable mail item, then print each card with respective different addresses supplied from a list of mailing addresses, apply postage, and deliver the printed addressed mail items to a shipping service for direct mailing to the addressees. In general, in the past, the specified quantity of mail items was first printed, and then the printed mail items were supplied to a separate addressing system which sequentially applied addresses from the mailing list onto the individual printed mail items.

For large quantities of the identical printed matter (i.e., the printed product without the address printed thereon), volume-based printing houses typically utilized industrial offset printers to print the unaddressed mail items. At large volume, the operations cost to print using offset printing presses was in the past significantly less than other printing options. However, the minimum quantity of mail items that needed to be printed before the printer started making a profit after considering setup, print and operations costs (i.e., the profit point) was fairly high, often a minimum of several hundreds of mail items. For this reason, mailing services companies typically fulfilled only large-volume orders.

With advancements in the technology and speed of industrial digital printing machines, digital printing has become a very viable option for printing mailing services print jobs. Digital printing systems, such as those based on inkjet or laserjet technologies, offer an advantage over offset printing in that digital printers are a "direct print" technology in contrast to the indirect printing process of offset technologies. That is, offset presses require an aluminum plate to be created for each of the colors (Cyan, Yellow, Magenta and Black, known as CMYK in the industry) used to print full-color images. Digital presses do not utilize aluminum plates and instead directly apply (via inkjet print heads) ink to the paper.

With these advances, mailing services providers can now print large volumes of print items using digital presses. However, to make mailing services orders a profitable business, mailing services companies still need to print large quantities of print items and to achieve high volume, print multiple print items on large single sheets, which are stacked and separated into individual printed items, typically by a laser cutter or guillotine cutter, after printing. This increases throughput capability and allows flexibility in the size(s) of the items to be printed.

In the past, individual mail item designs were assigned to different positions in a two-dimensional gang of print items, and the two-dimensional print gang was printed a number of times to produce a stack of identical gang sheets, each containing corresponding print items in corresponding positions on the printed gang sheet. The stack of printed sheets was then separated into individual stacks corresponding to different printed item positions in the gang (and often corresponding to different customer orders). To work efficiently, this methodology requires that the desired quantity of each of the individual print items placed into the different individual slots (or positions) of the gang is the same. In other words, a gang may include positions for eight different print items. Each position can be filled by a print item from a different order, where each order ideally specifies the same quantity of printed items. The gang can be printed a number of times (preferably equal to the specified quantity) to produce a stack of printed gang sheets. The stack can then be separated into individual stacks, each stack containing the specified quantity of the print item occupying the same position in the gang. To keep track of different customer orders, a customer order for a quantity of a particular mail item would be placed one or more positions in the gang, and the same gang sheet is printed multiple times and then separated into individual stacks. This methodology prevents multiple customer orders from being intermingled in any given stack. Thus, if a given stack is damaged or lost, that stack can be reprinted.

The above-described ganging methodology presupposes the aggregation of print orders of the same quantity or multiple thereof. Using this methodology, mailing services providers have two choices: require orders to be in predetermined quantities or multiples thereof (so the orders can occupy more than one slot in a gang), or allow some of the printed items to be wasted (on those orders that are not for one of the predetermined quantities or multiples thereof). This leads to waste and can cause delay in printing while waiting for sufficient numbers of orders of the predetermined quantity.

Accordingly, other ganging methodologies are desired that would allow mailing services orders of any quantity to be processed. It would also be desirable if such methodology allowed a simple reprinting methodology for reprinting individual stacks of print items.

SUMMARY OF THE INVENTION

Methods and systems for processing multiple mailing services orders for print items of varying quantities include a variable print ganging process. Multiple orders each specifying a respective print item, a respective list of addresses, a respective specified quantity to be printed, and a respective order ID are received. For each order, an active quantity is associated with the order and initialized to the same number as the respective specified quantity to be printed. A gang file is generated and structured to include a plurality of empty cells organized in a 3-dimensional grid such that at least one dimension corresponds to pages to be printed on a substrate and the other two dimensions correspond to positions of individual stacks of print items to be printed. To fill the gang, a stack identifier corresponding to an unfilled stack having available empty content slots in the gang file is obtained, along with a current number of available slots in the stack identified by the stack identifier. The system identifies an open order having an associated non-zero active quantity of items remaining to be processed. The system creates a new fulfillment item identifier and associates the new fulfillment item identifier with the stack identifier. The system determines whether the active quantity associated with the open order is less than or equal to the current number of available slots in the stack identified by the stack identifier.

If the active quantity associated with the open order is less than or equal to the current number of available slots in the stack identified by the stack identifier, the system obtains a quantity of addresses associated with the mailing list associated with the open order in a quantity equal to the active quantity associated with the open order, renders a quantity of individual print-ready files containing the print item associated with the open order with each individual print-ready file containing a different one of the obtained addresses, associates the addresses and order identifier with the fulfillment item identifier, and inserts the individual print-ready files into respective empty cells of the gang within the stack identified by the stack identifier.

If the active quantity associated with the open order is greater than the current number of available slots in the stack identified by the stack identifier, the system instead obtains a quantity of addresses associated with the mailing list associated with the open order in a quantity equal to the current number of available slots, renders a quantity of individual print-ready files containing the print item associated with the open order with each individual print-ready file containing a different one of the obtained addresses, associates the addresses and order identifier with the fulfillment item identifier, and inserts the individual print-ready files into respective empty cells of the gang within the stack identified by the stack identifier.

The active quantity associated with the open order is then reduced by a number equal to the quantity of obtained addresses, and open orders are continually processed according to the above process until the gang file is filled, or alternatively no more open orders are available or a predetermined period of time passes.

Additionally, the system and method may further include capability to reprint individual stacks that do not pass a quality control inspection. To submit an individual stack for reprint, the system determines a stack identifier associated with the individual stack of print items, determines existing fulfillment item identifiers associated with the stack identifier, and for each determined fulfillment item identifier, determines the associated order identifier, determines a quantity of addresses associated with the fulfillment item identifier, adds the determined quantity to the active quantity associated with the order identifier, and de-associates the order identifier and all addresses associated with the fulfillment item identifier from the fulfillment item identifier.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 2 is an exemplary embodiment of an address database;

FIG. 3A is a schematic diagram illustrating an exemplary 3-dimensional structure of a gang template;

FIG. 4 is an exemplary embodiment of an Orders Processing database;

FIG. 5 is an exemplary Fulfillment Items database;

FIG. 7A is an example of a 3-dimensional printed gang;

FIG. 7B is a 3-dimensional perspective view of the multiple individual stacks of the gang;

FIG. 7C is an exemplary Order Processing database;

FIG. 7D is an exemplary Fulfillment Item database for the example shown in FIGS. 7A-7C.

DETAILED DESCRIPTION

In general, the term "Mailing Services Product" refers to the combined product of a printed product containing a particular print design where the individual printed product items are additionally and uniquely printed with addresses. Preferably, but not necessarily, such addresses are either supplied from or purchased by customers of the mailing service provider. These product items are then delivered into the mail stream and each is sent directly to the respective address printed on the respective product item.

Orders for mailing services products generally include a print design to be printed on every item, an address list (or pointer thereto), a specified quantity of print items to produce, and other typical print order details such as customer identifier, customer contact information, customer payment information, desired date of delivery, etc.

Figure 1:
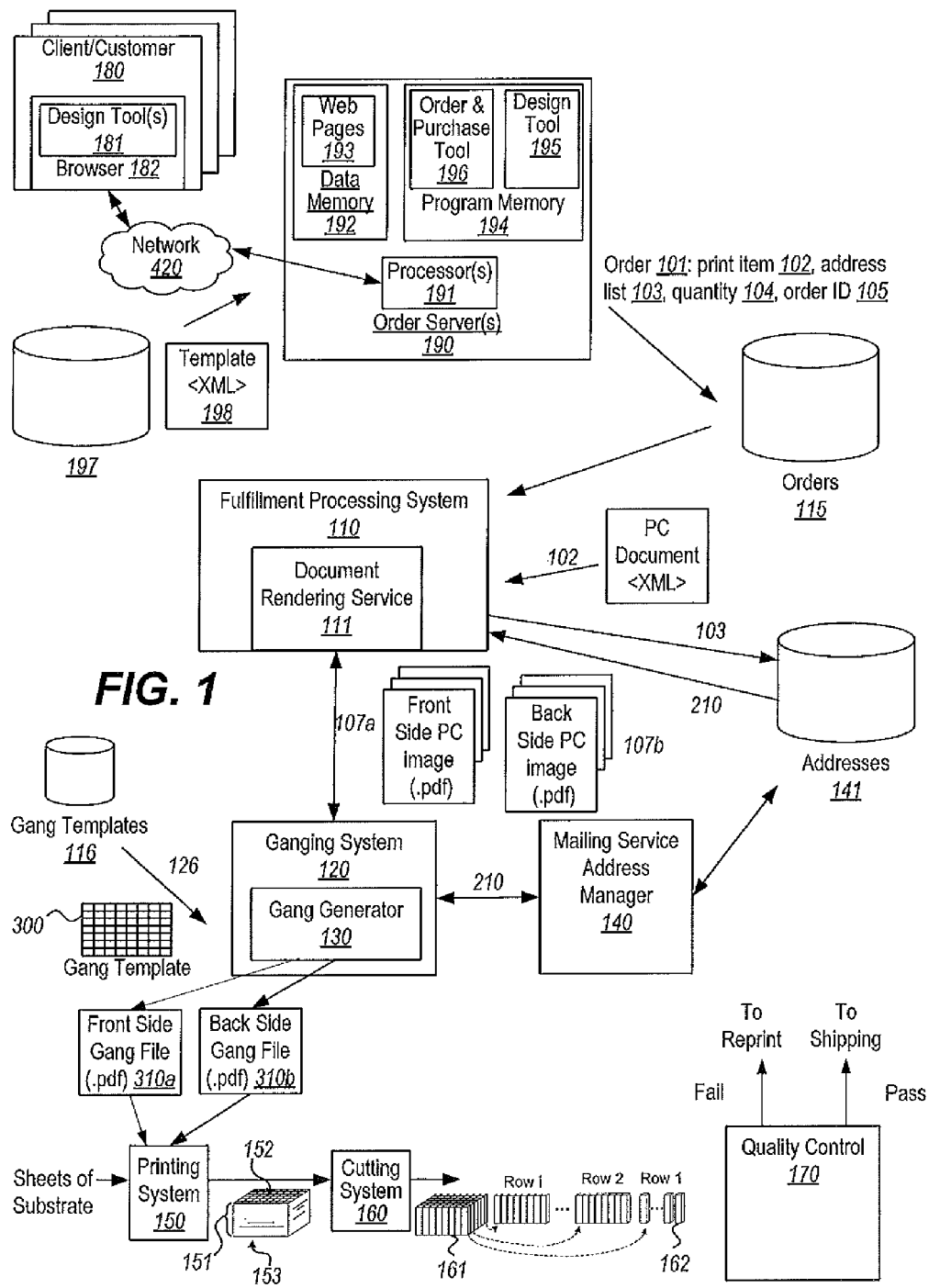
FIG. 1 is a schematic block diagram of a mailing services system.

FIG. 1 is a schematic block diagram of an exemplary system 100 in which embodiments of the invention may operate. As indicated, the system may include individual components, including a Fulfillment Processing System 110, a Ganging System 120 including a Gang Generator 130, a mailing services Address Manager 140, an Operator Interface 150, a Tray Manager 160, and a Shipment System 170.

The fulfillment processing system 110 is a computerized order fulfillment system which generally controls the fulfillment processing of mailing services product orders 101 by communicating with and/or otherwise interfacing with, and/or managing the workflow of, other system components 120, 140, 150, 160. Mailing service product orders 101 are either sent directly to the fulfillment processing system 110 or are placed in an order database 115 and accessed (i.e., pulled from the database 115) by fulfillment processing system 110. Each order includes, either directly (i.e., the actual item itself) or indirectly (i.e., by reference using an identifier from which the actual item can be obtained), at least the following items: the product design (i.e., the print information to be printed on every mail item), an address list, a specified quantity of mail items to be printed, and an order identifier. Additional items may be included in the order, such as a desired mailing or deliver-by date, a delivery service level (e.g., $1^{st}$ class mail, $2^{nd}$ day, standard, etc.), other parameters such as Oversize status, card stock, etc. and other typical print order details such as customer identifier, customer contact and billing address, billing information, etc.

Each mailing services product order 101 has an associated address list (see 200 in FIG. 2) containing a plurality of unique mailing addresses 210a, 210b, . . . , 210n to be used in printing the mailing services product. A Mailing Services Address 210a, 210b, . . . , 210n (generally referred to as 210) represents an address associated with a mailing services order, which may or may not get printed on printed product.

Figure 3A:
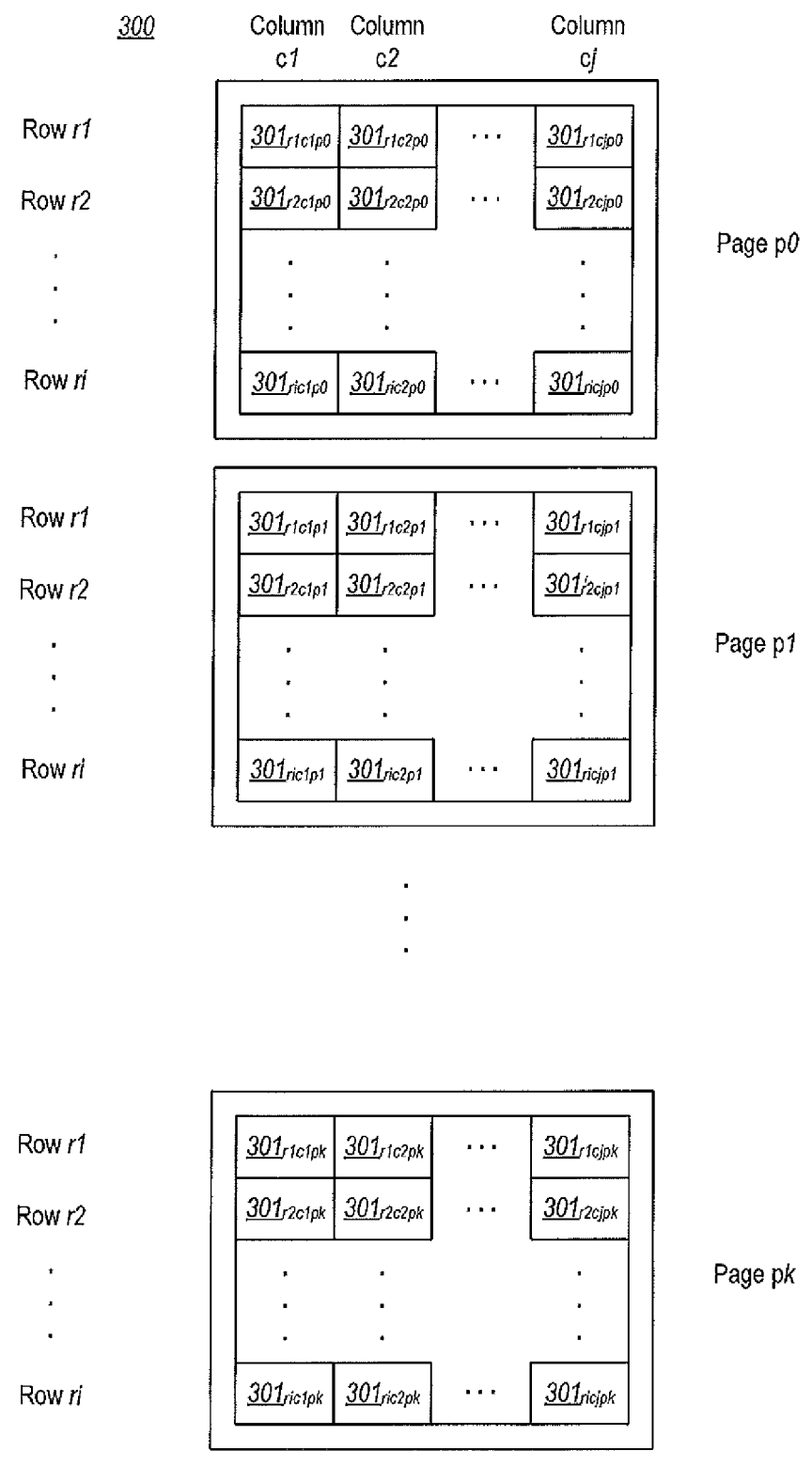
Figure 3B:
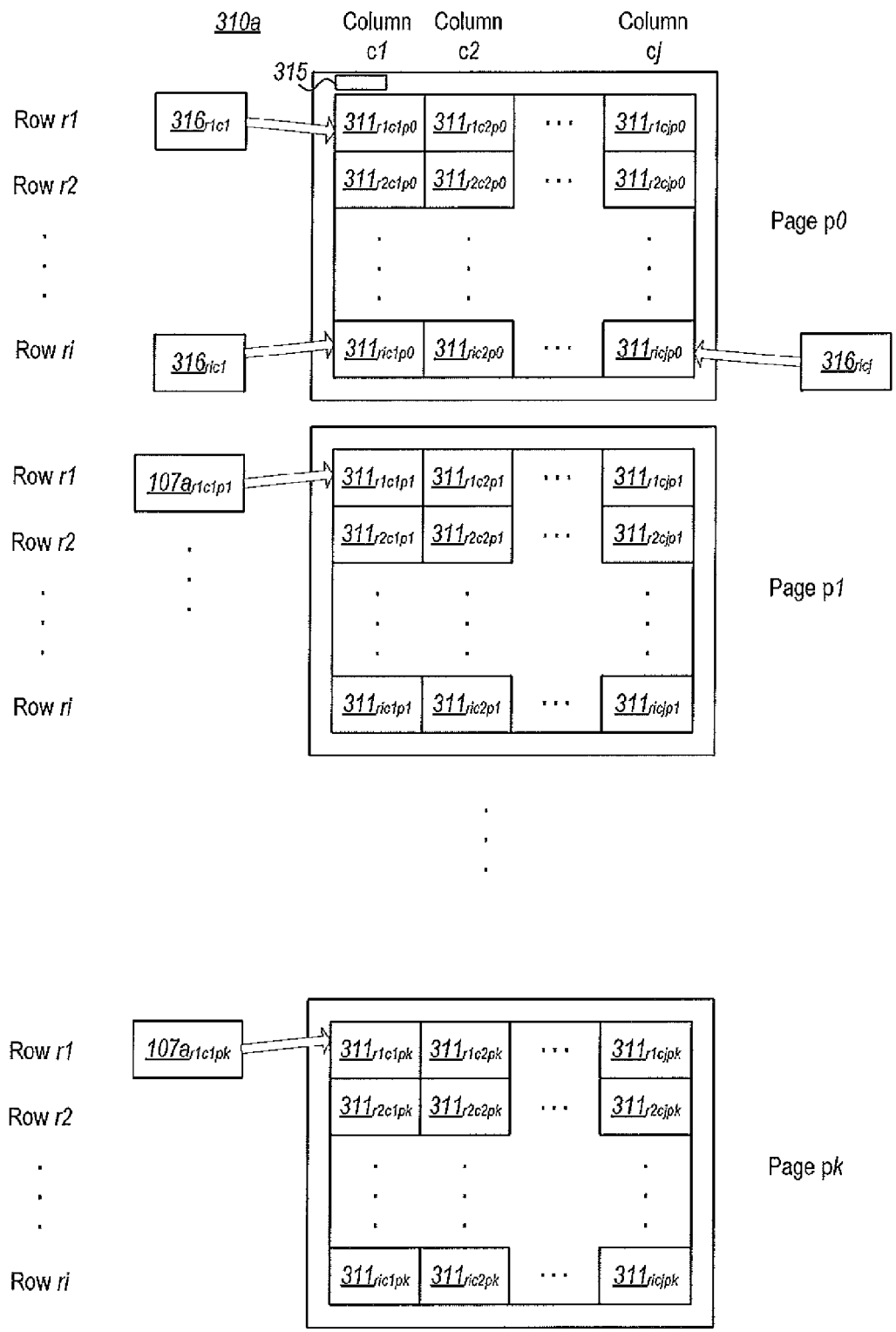
FIG. 3B is an exemplary front side gang file which may be created based on the gang template of FIG. 3A.

The ganging system 120 is either directed by the fulfillment processing system 110 or itself monitors the orders database 115 to determine when to create and fill gangs, which are aggregate print jobs containing multiple individual print jobs obtained from the orders. In operation, the ganging system 120 may retrieve a gang template 106 (such as gang template 300 shown in FIG. 3A) having a predetermined layout with a predetermined number of empty cells 301 (or "cells") at predetermined positions into which print-ready product images 107a, 107b (e.g., individual .pdf files) may be inserted. For example, FIG. 3A illustrates an example gang template 300 having a 3-dimensional grid layout of cells 301 arranged in i rows (r1–ri), j columns (c1–cj), and k+1 pages (p0–pk). The cells 301rcp, where r::1 to i, c::1 to j, and p::0 to k (referred to generally herein as 301) of a gang template 300 are empty of content to be printed. Each cell 301 in the gang template 300 is uniquely identifiable by its position in the gang template 300.

Figure 3C:
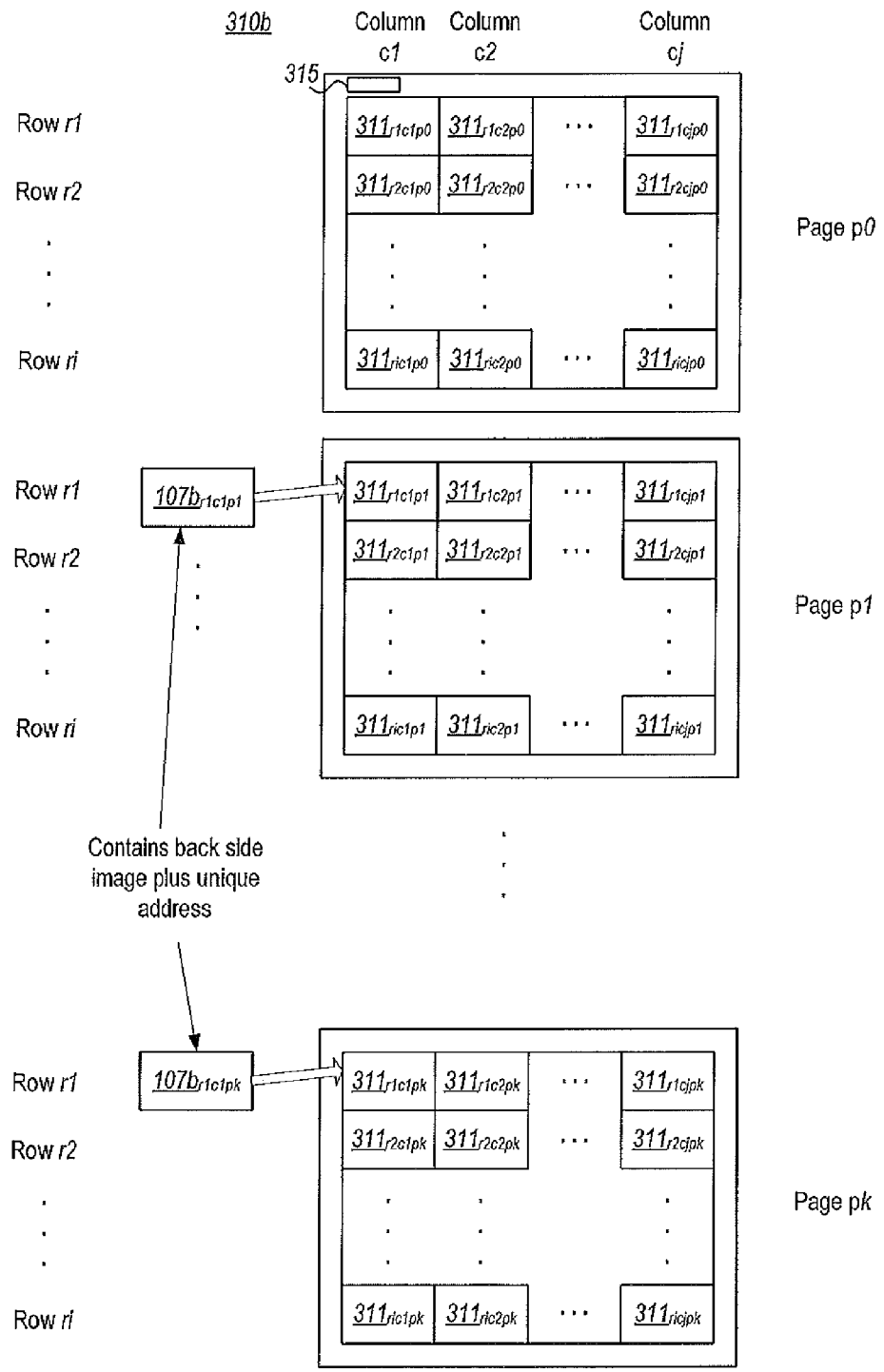
FIG. 3C is an exemplary back side gang file which may be created based on the gang template of FIG. 3A.

Returning to FIG. 1, the ganging system 120 selects a gang template 106 (such as 300 in FIG. 3A), copies the selected gang template 300 to create a new front side content gang file (such as 310a in FIG. 3B), assigns a gang identifier 315 to the new content gang file 310, and then fills each empty cell 311 in the gang file 310 with one print-ready product image 107. A back side content gang file (such as 310b in FIG. 3C) is also created, containing individual print-ready files with the back side image along with a unique mailing address.

The ganging system 120 operates in conjunction with the fulfillment processing system 110, document rendering service 111, and mailing service address manager 140 to obtain print-ready product images 107 for insertion into cells 311 of the gang file 310. In general, for a mailing services product, the printed item includes a front side image 107a and a back side image 107b. In general, for a given mailing services product, the front side image of each printed item associated with the mailing services order is identical, whereas the back side image includes a unique address printed thereon and may further include an additional image that is identical for each printed item in the order. In other words, the differentiator across all of the printed items in the mailing services order is the unique address printed on each item.

For purposes of ganging, each gang file includes a front side gang file 107a and a back side gang file 107b. The front and back images of each print item occupy the same position in the respective front and back gang files 107a, 107b.

In order to facilitate the generation of the front side images 107a and back side images 107b, in an embodiment one or more databases are maintained. In an embodiment shown in FIG. 4, an Order Processing database 400 is maintained which associates an order ID 105, the ordered quantity 105, and a parameter referred to as Active Quantity 109. The order ID 401 is the same order ID 105 as contained in an order 101 received by the fulfillment processing system. The Ordered Quantity 402 is the quantity 104 specified in the order 101. The Active Quantity 403 is the number of print items remaining which still need to be assigned to a fulfillment item 503 (FIG. 5) (as discussed in detail hereinafter).

An additional Fulfillment Item database for associating addresses of an order with fulfillment items 503 may be maintained, either separately (as shown at 500 in FIG. 5) or merged with the Order Processing database in an aggregate database (not shown). In general, the Mailing Services Address Manager 140 maintains addresses associated with address lists associated with orders 101 in an Addresses database 141. The Address Manager 140 is responsible for reserving and unreserving addresses requested by the ganging system 120 and maintaining the associations of the addresses of different Order IDs together with associations with different fulfillment items.

Figure 6:
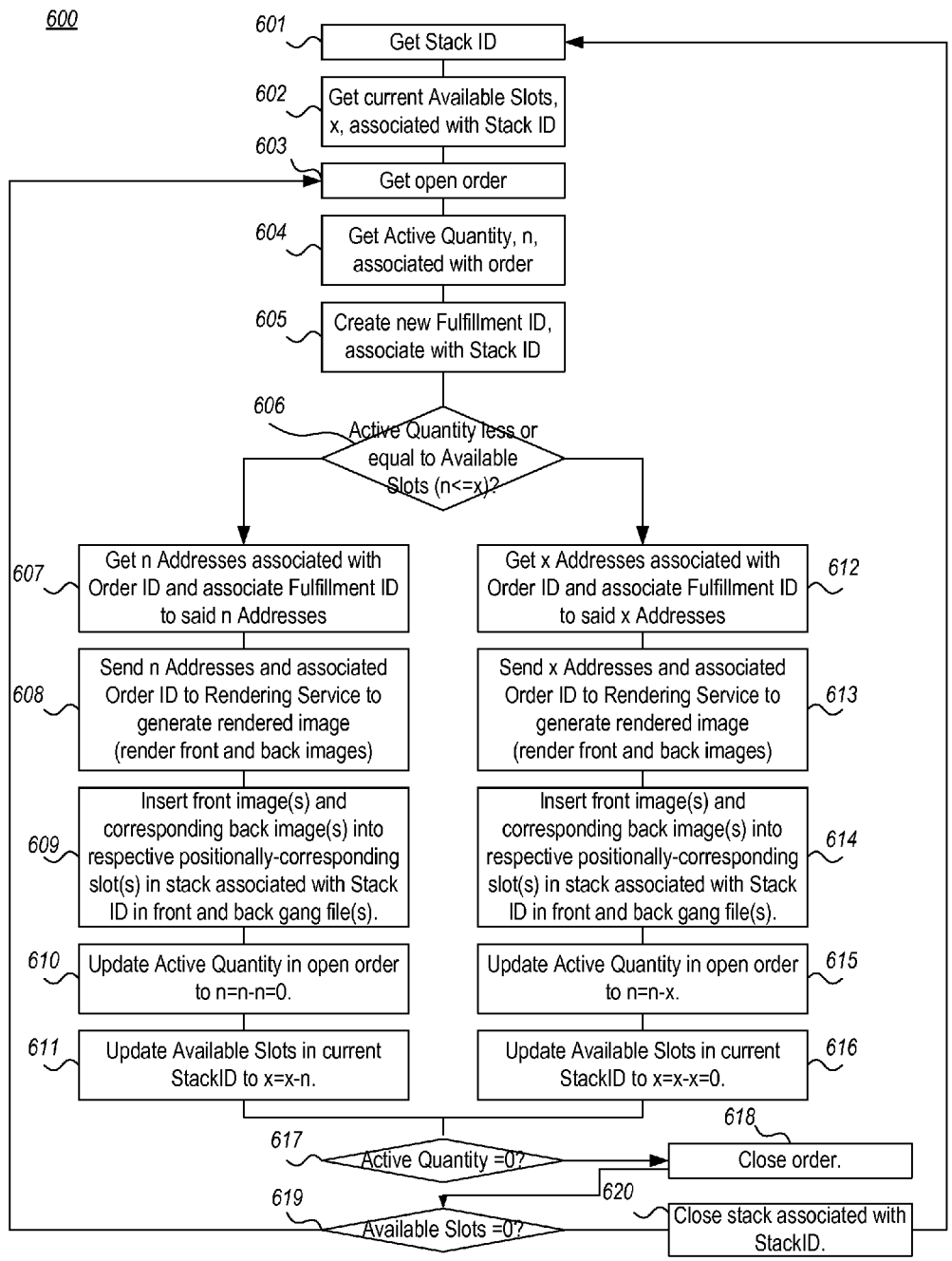
FIG. 6 is a flowchart of an exemplary method for creating a 3-dimensional gang for digital printing.

FIG. 6 is a flowchart illustrating an exemplary method for generating the gang files 107a, 107b, which may be performed by the gang generator 130. As illustrated, the method 600 includes obtaining a stack identifier (StackID) (step 601).

The StackID is the identifier that will be placed in a gang cell on the top page of the gang and is used to identify the entire stack of printed items when the items are printed and separated into separate stacks. During ganging, the number of available slots associated with each StackID is initially set to the number of content pages (i.e., k in FIGS. 3A and 3B). That is, each stack is k items deep (not counting the top identifier item). Thus, in order to keep track of orders, fulfillment items, and addresses, one needs to know how many slots are available in the stack that is being filled. Accordingly, the method obtains the current number, x, of Available Slots, which is initialized to k (step 602).

The gang generator 130 then obtains an open order (step 603). An open order is an order that still has a quantity of items that has not been assigned to any fulfillment item. For example, the Order Processing database 400 shown in FIG. 4 maintains an Active Quantity 403 field which indicates how many print items ordered still have not been assigned to a fulfillment item. The gang generator 130 obtains the Active Quantity, n, associated with the obtained open order (step 604), creates a new Fulfillment ID and associates the new Fulfillment ID with the current to Stack ID (step 605).

The gang generator 130 then determines whether the Active Quantity is less than or equal to the Available Slots (i.e., is n<=x?) (step 606). If the Active Quantity is less than or equal to the Available Slots in the current stack, then the gang generator 130 requests from the mailing services Address Manager 140 n addresses associated with the Order ID of the current open order. The Address Manager 140 selects and returns n addresses from the mailing list associated with the Order ID, and associates the returned addresses with the Fulfillment ID in the Addresses database 141 (i.e., in the database 500 in FIG. 5). The gang generator 130 requests the Document Rendering Service 111 to create individual print-ready files 107a, 107b for each print item associated with the n returned addresses and the print item 102 (step 608). That is, given the Order ID, the Document Rendering Service 111 can obtain the print item 102 (preferably in the form of an <XML> Document) associated with the order, render the front side of the document to generate the front side image (.pdf) 107a, and then combine and render the back side of the document and one of the returned n addresses to generate the back side image (.pdf) 107b, repeating this process n times to generate n uniquely addressed print items. The gang generator 130 inserts one uniquely addressed print item front side and back side image file 107a, 107b in the same position in each of the corresponding front and back gang file cells, and repeats this along the same stack (same row and column but different page numbers in the gang) for each of the n set of files (step 609). The Active Quantity is then updated (step 610) in the Order Processing database 40, as well as the Available Slots associated with the current Stack ID (step 611). A similar process is performed in steps 612 through 616 if the Active Quantity is greater than the Available Slots (i.e., n>x). Generally, if the Active Quantity is less than or equal to the number of Available Slots (i.e., n<=x), all remaining print items in the order will become assigned to a Fulfillment ID, the Active Quantity will be reduced to zero, and the order will close out (step 617 and 618). The stack associated with the Stack ID may or may not close out, depending on whether n=x (resulting in the closing of the stack (step 619 and 620)) or n<x (resulting in the stack remaining open for further filling). In contrast, when the Active Quantity is greater than the Available Slots (i.e., n>x), the current stack associated with the Stack ID will be closed out (the number of Available Slots will go to zero) (step 619 and 620), while the Active Quantity will not be reduced to zero upon filling the current stack and the order associated with the Order ID will remain open for further processing. The order associated with the Order ID is thus fulfilled in multiple Fulfillment Items.

Returning once again to FIG. 1, each cell 301 in the gang template 300 (FIG. 3A) is associated with a unique position in the 3-dimensional structure imposed by the gang template 300. The structure imposed by the gang template 300 carries through to the content gang file(s) 310a, 310b created from the template 300. Thus, when a print-ready (.pdf) product image $107_a$, $107_b$ (such as the front-side and back-side image to be printed on a post card) is inserted into an empty cell 311 in a positionally-corresponding position in each of the content gang files 310a, 310b, the product image $107_a$, $107_b$ is associated with a unique position identifier in the content gang file 510. Both the gang identifier 315 and the stack identifier $316_{rc}$ are then associated (by way of a link such as via one or more relational database table(s) 400, 500 or other linking mechanism) with the Fulfillment ID associated with the particular print items placed in the corresponding stack. Links may be in the form of computer readable relational database tables or objects stored in computer readable memory.

In one embodiment, when the ganging system 120 creates a new content gang (front and back-side gang files 310a, 310b), the ganging system 120 inserts the Stack ID positionally associated with the stack in the corresponding cell position on the first page (page 0, i.e., k=0 in FIG. 3B) of the front side gang file 107a. In an embodiment, the gang ID 315 is placed outside the print area of the gang cells 301 but on the first page (page 0, i.e., k=0 in FIG. 3B) of the front side gang file 107a. In one embodiment, the gang identifier 315 and the Stack IDs 316 are each implemented as barcodes. All instances of a Stack IDs 316 (shown as $316_{r1c1}$, $516_{r1c2}$, ..., $516_{ricj}$ are unique across any given identifier gang file 310a, 310b—that is, no two stacks contain the same Stack ID identifier.

The fulfillment processing system 110 and ganging system 120 continually retrieve orders 101 from the Orders database 115, request mailing services product print item rendering, and insert associated print item images 107a, 107b into respective empty cells 311 of the content gang file 310 in a stack-wise manner (filling each stack before filling the next stack) until all cells 311 in the content gang file 310 are filled or until some other condition is met (for example, a time limit is reached, etc.). When a content gang file 310 is closed and saved, it is submitted to a printing system 150, which prints the content gang files 310a, 310b onto the front and back sides of sheets of substrate. The gang files 310a, 310b contain the aggregated images of different print items associated with at least one and potentially a plurality of different orders). The first identifier sheet 152 (k=0) is printed first to become the top of the stack of printed content gang sheets 151, together forming a completed gang sheet stack 153. A completed gang sheet stack comprises one or more content gang sheets $151_1$, $151_1$, ..., $151_k$ topped by an identifier gang sheet 152.

The completed gang sheet stack 153 is then submitted to a cutting system 160 which separates all sheets in the stack 153 into individual stacks 161 of printed items. The cutting system 160 may utilize laser or blade technology. The individual stacks are then sent to a Quality Control system 170 whereby the print and cut quality of the individual stacks is inspected for quality, passed to shipment if the quality meets minimum standards, and rejected and sent to reprint if the quality fails minimum standards. Individual stacks of printed items that are sent to shipment are fully addressed and can be processed for direct shipment. In an embodiment, postage indicia can be supplied to the Document Rendering Service 111 to be rendered along with the address and back side image for the back side print item file 107b. This allows entire individual stacks of printed items (that pass Quality Control) to be placed directly into the postal system for delivery to address recipients.

Various features of the system may be best understood through an illustrative example. FIG. 7A shows a 3-dimensional view of a gang file 700. In this example, the gang file 700 is structured to have 2 rows (r1, r2) and 2 columns (c1, c2), and 201 pages (p0, p1, ..., p200), where the first page p0 is reserved for unique stack identifiers ID1, ID2, ID3, ID4.

FIG. 7B shows the sequence of stacks ID1, ID2, ID3, ID4 in the order they are filled by the gang generator 130. FIG. 7C shows the Order Processing Database during which several orders (with Order IDs 1, 2, 3, 4) being processed. FIG. 7D shows the Fulfillment Item database and the allocation of mailing list addresses associated with the different Order IDs to various Fulfillment Item IDs based on the order in which the Orders are processed and placed in the gang 700. As illustrated, the first open order processed by the gang creator 130 is Order 1, which has a quantity of 1 ordered item in the order. The 1 print item is assigned to the first slot in the first stack ID1 of the gang and is assigned Fulfillment Item ID1. The Active Quantity associated with Order 1 is reduced to 0 and Order 1 is then considered closed. The gang creator 130 then obtains the next open order having a non-zero Active Quantity, and allocates 50 slots in Stack ID1 for the 50 ordered items, assigning Fulfillment Item ID2 to the 50 addresses associated with Order 2. The next open order is Order 3, which has an Order Quantity of 400. Since there are only 149 Available Slots remaining in the stack ID1, 149 print items associated with the Order ID are inserted in the remaining 149 slots of the stack ID1, and the Active Quantity is updated to reflect that assignment of 149 of the mailing addresses to a Fulfillment item. Since the stack ID1 is completely filled, the stack can be considered closed, and the gang generator 130 will select the next stack ID2 in the stack sequence. Order 2 is still open, having a non-zero Active Quantity of 251. Since the stack ID2 has an Available Slots quantity of 200, the stack ID2 can be filled completely with print items from the open order associated with Order ID3, thereby reducing the Active Quantity by 200 (to 51). Stack ID2 is then closed, and the next stack ID3 is then filled, in the illustrative embodiment by filling the first 51 slots with the remaining 51 print items from Order ID3, and the next 149 slots with print items from Order ID4. Stack ID4 is then filled with the next 200 print items from Order ID4, completing the gang 700. The remaining print items from Order ID4 are filled in a different gang.

One of the great advantages of filling the gang in the described manner is the ability to easily reprint an entire stack of print items without holding up the remaining items associated with a print order. Once in a while, Quality Control may discover that an individual stack of printed items must be reprinted. This can happen, for example, when the cutter is not aligned properly, or when the printing system is not performing to standard, for example when one or more of the inkjet nozzles becomes clogged. In such a case, one or more individual stacks may be sent to reprint.

Figure 8:
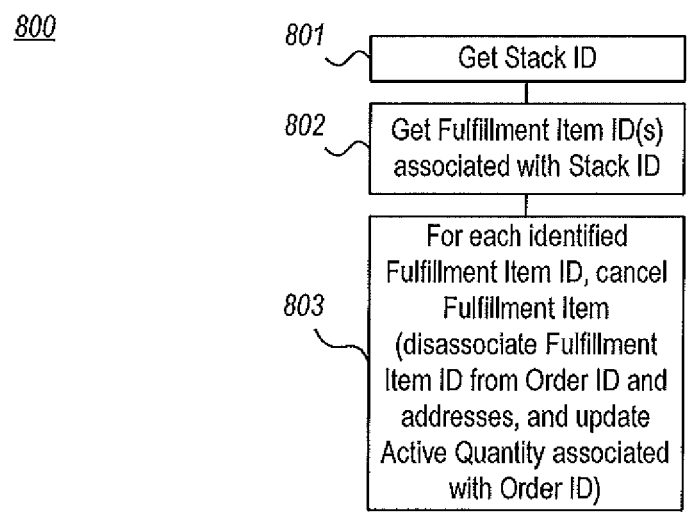
FIG. 8 is a flowchart of an exemplary method for submitting a stack of printed items to the ganging system for reprint.

FIG. 8 shows a flowchart of an exemplary method for reprinting an individual stack of print items. To reprint an individual stack of print items, the following steps are preferably performed: First, the stack ID is scanned to determine which Fulfillment Item IDs are associated with the stack (step 801). Next, the Fulfillment Item ID(s) associated with the Stack ID are identified (step 802). The Order ID and the addresses associated with the Fulfillment Item IDs are then de-associated with the Fulfillment item ID in the Fulfillment Item database and the quantity of addresses associated with the de-associated Fulfillment Item ID is then added to the current Active Quantity associated with the Order ID (which is associated with the de-associated Fulfillment Item ID) (step 803). Then, when the gang generator 130 gets an open order, the Order ID associated with the de-associated Fulfillment Item ID will come up eventually to the gang generator as an open order and the print items associated with the de-associated Fulfillment Item ID will be regenerated and placed in one or more new stacks of one or more new gangs and reprinted. Thus, reprinted print items need not hold up print items that pass the Quality Control test, and can be easily and automatically reprinted in a timely manner without the operator having to manually determine which addresses need to be reprinted.

Those of skill in the art will appreciate that the invented method and apparatus described and illustrated herein may be implemented in software, firmware or hardware, or any suitable combination thereof. Preferably, the method and apparatus are implemented in software, for purposes of low cost and flexibility. Thus, those of skill in the art will appreciate that the method and apparatus of the invention may be implemented by a computer or microprocessor process in which instructions are executed, the instructions being stored for execution on a computer-readable medium and being executed by any suitable instruction processor. Alternative embodiments are contemplated, however, and are within the spirit and scope of the invention.

Although this preferred embodiment of the present invention has been disclosed for illustrative purposes, those skilled in the art will appreciate that various modifications, additions and substitutions are possible, without departing from the scope and spirit of the invention as disclosed in the accompanying claims.

What is claimed is:

1. A method for processing multiple mailing services orders for print items of varying quantities, the multiple orders each specifying a respective print item, a respective list of addresses, a respective specified quantity to be printed, and a respective order ID, and having associated therewith an active quantity initialized to the same number as the respective specified quantity to be printed, the method comprising the steps of:
    generating a gang file, the gang file comprising a plurality of empty cells organized in a 3-dimensional grid, wherein at least one dimension corresponds to pages to be printed and the other two dimensions correspond to positions of individual stacks to be printed;
    obtaining a stack identifier cooresponding to an unfilled stack having available slots corresponding to empty cells belonging to the same individual stack but different pages in the gang file;
    determining a current number of available slots in the stack identified by the stack identifier;
    receiving an open order having a non-zero active quantity;
    creating a new fulfillment item identifier and associating the new fulfillment item identifier with the stack identifier;
    determining whether the active quantity associated with the open order is less than or equal to the current number of available slots in the stack identified by the stack identifier;
    if the active quantity associated with the open order is less than or equal to the current number of available slots in the stack identified by the stack identifier, obtaining a quantity of addresses associated with the mailing list associated with the open order in a quantity equal to the active quantity associated with the open order, rendering a quantity of individual print-ready files containing the print item associated with the open order with each individual print-ready file containing a different one of the obtained addresses, associating the addresses and order identifier with the fulfillment item identifier, and inserting the individual print-ready files into respective empty cells of the gang within the stack identified by the stack identifier;
    if the active quantity associated with the open order is greater than the current number of available slots in the stack identified by the stack identifier, obtaining a quantity of addresses associated with the mailing list associated with the open order in a quantity equal to the current number of available slots, rendering a quantity of individual print-ready files containing the print item associated with the open order with each individual print-ready file containing a different one of the obtained addresses, associating the addresses and order identifier with the fulfillment item identifier, and inserting the individual print-ready files into respective empty cells of the gang within the stack identified by the stack identifier;
    reducing the active quantity associated with the open order by a number equal to the quantity of obtained addresses; and
    repeating the obtaining step through the reducing step until the existence of at least one of the gang file is filled, no more open orders are available, or a predetermined period of time passes.

2. A mail services order processing system for printing items of varying quantities, comprising:
    one or more processors configured to perform the method of claim 1.

3. The method of claim 1, further comprising reprinting individual stacks that do not pass a quality control inspection, the reprinting comprising:
    determining a stack identifier associated with the individual stack of print items;
    determining existing fulfillment item identifiers associated with the stack identifier;
    for each determined fulfillment item identifier, determining the associated order identifier, determining a quantity of addresses associated with the fulfillment item identifier, adding the determined quantity to the active quantity associated with the order identifier, and de-associating the order identifier and all addresses associated with the fulfillment item identifier from the fulfillment item identifier.

4. A mail services order processing system for printing items of varying quantities, comprising:
    one or more processors configured to perform the method of claim 2.

5. A method for processing multiple mailing services orders for print items of varying quantities, each order specifying at least a respective print item, a respective quantity of the specified print item to be printed, and a respective order identifier (ID), and each order for a respective print item having associated therewith a list of addresses, the method comprising the steps of:
    generating a gang, the gang comprising a plurality of cells each configured to receive print item content, the plurality of cells organized to correspond to a plurality of stacks, the plurality of cells organized in two dimensions to define a plurality of uniquely identified stack positions corresponding to respective unique stack identifiers and organized in a third dimension to define a depth of the plurality of stacks;

selecting from the gang an unfilled stack having at least one cell available to receive print item content;

determining a current number of unfilled cells in the selected stack that have yet to be filled with print item content;

receiving an open order corresponding to an order wherein at least a non-zero quantity of the print item remains to be printed;

creating a new fulfillment item identifier and associating the new fulfillment item identifier with the selected unfilled stack;

determining whether the quantity of the print item associated with the open order which remains to be assigned to a cell in a gang for printing is less than or equal to the current number of unfilled cells in the selected unfilled stack;

if the determined quantity is less than or equal to the current number of unfilled cells in the selected unfilled stack, receiving one or more addresses from a mailing list associated with the open order, the received number of addresses being of a quantity equal to the determined quantity, rendering a quantity of individual print-ready files containing the print item associated with the open order such that each individual print-ready file contains a different one of the received addresses, associating the received addresses and order identifier with the fulfillment item identifier, and inserting the individual print-ready files into respective empty cells of the gang within the selected unfilled stack;

if the determined quantity is greater than the current number of unfilled cells in the selected unfilled stack, receiving one or more addresses from a mailing list associated with the open order, the received number of addresses being of a quantity equal to the current number of unfilled cells in the selected unfilled stack, rendering a quantity of individual print-ready files containing the print item associated with the open order with each individual print-ready file containing a different one of the received addresses, associating the received addresses and order identifier with the fulfillment item identifier, and inserting the individual print-ready files into respective empty cells of the gang within the selected unfilled stack; and repeating the selecting step through the inserting steps until the existence of at least one of the gang file is filled, no more open orders are available, or a predetermined period of time passes.

6. The method of claim 5, wherein the receiving step comprises receiving addresses from the mailing list associated with the open order that have not yet been associated with any fulfillment identifier that is associated with the open order.

7. The method of claim 5, wherein the gang is filled in a stackwise manner by filling each stack in order before filling a next stack in the gang.

8. The method of claim 5, wherein at least one unique stack identifier is inserted in the cell corresponding to the first page of the grid and in its associated stack position.

9. The method of claim 8, wherein the at least one unique stack identifier comprises a barcode.

10. The method of claim 5, further comprising reprinting individual stacks that do not pass a quality control inspection, the reprinting comprising:

determining a stack identifier associated with an individual stack to be reprinted;

determining existing fhlfillment item identifiers associated with the stack identifier;

for each determined fulfillment item identifier, determining the associated order identifier, determining a quantity of addresses associated with the fulfillment item identifier, adding the determined quantity to the active quantity associated with the order identifier, and de-associating the order identifier and all addresses associated with the fulfillment item identifier from the fulfillment item identifier.

11. A mail services order processing system for printing items of varying quantities, comprising:

one or more processors configured to perform the method of claim 5.

12. A mail services order processing system for printing items of varying quantities, comprising:

one or more processors configured to perform the method of claim 10.

* * * * *